(12) United States Patent
Nakatani et al.

(10) Patent No.: US 6,658,170 B1
(45) Date of Patent: Dec. 2, 2003

(54) IMAGE PROCESSING APPARATUS AND IMAGE PROCESSING METHOD

(75) Inventors: Akihiko Nakatani, Yokohama (JP); Tadashi Yamamoto, Yokohama (JP); Kiyoshi Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,474

(22) Filed: Nov. 23, 1998

(30) Foreign Application Priority Data

Dec. 10, 1997 (JP) ................................ 9/356390

(51) Int. Cl.⁷ .......................... G06K 7/00; H04N 1/46
(52) U.S. Cl. ............................ 382/312; 358/509
(58) Field of Search ................. 382/266, 124, 382/312; 250/327.2; 358/448, 474, 471, 509, 527

(56) References Cited

U.S. PATENT DOCUMENTS

| | | | | |
|---|---|---|---|---|
| 4,551,626 A | * 11/1985 | Agano | ........ | 250/327.2 |
| 4,692,812 A | 9/1987 | Hirahara et al. | ........ | 358/285 |
| 4,868,657 A | * 9/1989 | Samuels | ........ | 358/140 |
| 5,291,240 A | * 3/1994 | Jain | ........ | 355/53 |
| 5,887,085 A | * 3/1999 | Otsuka | ........ | 382/266 |
| 6,149,856 A | * 11/2000 | Zemel | ........ | 264/401 |
| 6,289,114 B1 | * 9/2001 | Mainguet | ........ | 382/124 |

FOREIGN PATENT DOCUMENTS

| | | | | |
|---|---|---|---|---|
| EP | 0 431 774 A2 | 6/1991 | ........ | H04N/1/18 |
| EP | 0 641 115 A1 | 3/1995 | ........ | H04N/1/024 |
| EP | 0 744 860 A1 | 11/1996 | ........ | H04N/1/40 |
| JP | 05014610 | * 1/1993 | ........ | H04N/1/40 |
| JP | 411234535 A | * 8/1999 | ........ | H04N/1/60 |

* cited by examiner

*Primary Examiner*—Jerome Grant, II
(74) *Attorney, Agent, or Firm*—Fitzpatrick, Cella, Harper & Scinto

(57) ABSTRACT

In an image processing apparatus, after a current band of an image has been read, an original is fed at a distance of the upper half band width of the current band. When the next band is read, the current band at the lower half band width is overlappingly read. The band data at the lower half band width of the current band is stored in a memory, and the next band is read. Averaging processing or function processing is applied to the band data which has been overlappingly read.

6 Claims, 7 Drawing Sheets

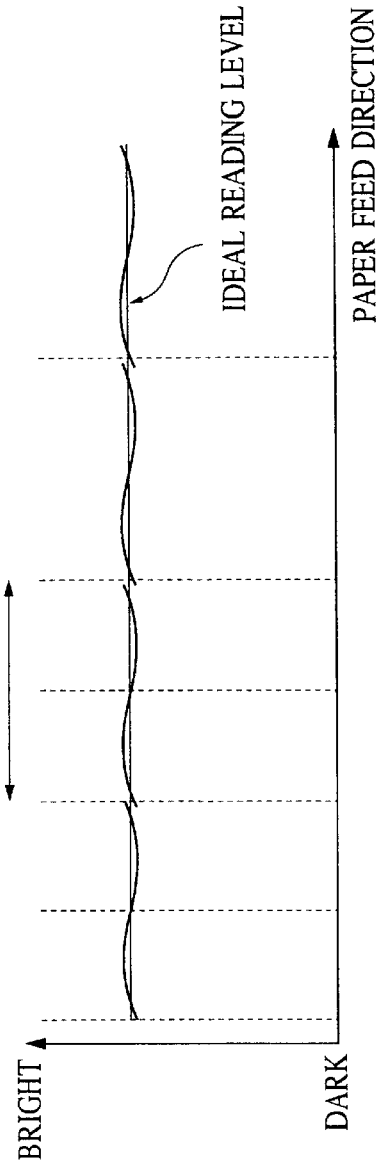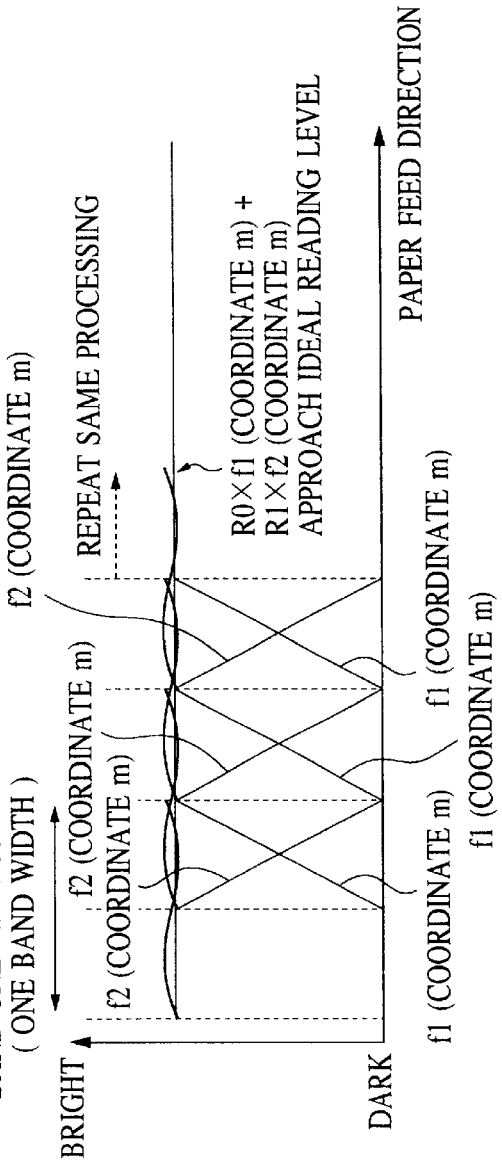

IMAGE PROCESSING APPARATUS AND IMAGE PROCESSING METHOD

BACKGROUND OF THE INVENTION

1. Field of the Invention

The present invention relates to image processing apparatuses, image processing methods, and recording media which effect high-quality images.

2. Description of the Related Art

A conventional image processing apparatus usually receives data from a computer and records on a recording sheet by a recording head according to the received data. Recently, some image processing apparatuses are provided with a function for reading an original by a scanner unit in addition to a recording function. In such an image processing apparatus, either a recording head or a scanner unit can be mounted on a carriage and both recording function and original reading function can be used with a recording-sheet conveying system being shared. In other words, in the image processing apparatus, a recording head for a recording method such as a dot-matrix, thermal transfer, or an ink jet type is detachably mounted on the carriage and moved along a recording sheet by moving means for recording. To read an original in the image processing apparatus, the recording head is removed from the carriage, a scanner unit is mounted thereon, and the scanner unit is moved along the original for reading it.

In such a conventional original reading method with a scanner unit, one-path reading is performed to read one band with the use of a green light source in a monochrome scanner unit. In a full-color scanner unit, reading is performed sequentially with the use of red, green, and blue light sources to read one band, the original is fed by the one-band width, and then this operation is repeated until the area to be read in the original which the user has specified is completely read.

In this conventional original reading method, however, a band unevenness is generated due to a change in the distance between the original and the scanner unit, and the image quality of the read original is reduced.

SUMMARY OF THE INVENTION

Accordingly, it is an object of the present invention to provide an image processing apparatus, an image processing method, and a recording medium which effect a high-quality image.

The foregoing object is achieved in one aspect of the present invention through the provision of an image processing apparatus including: reading means for reading an original at a predetermined reading width in the main scanning direction; controlling means for controlling such that the reading means and the original move relative to each other in the main scanning direction and the sub scanning direction, the reading means reads the original at the predetermined reading width while the reading means and the original move relative to each other in the sub scanning direction, then the reading means and the original move relative to each other in the main scanning direction at a width smaller than the predetermined reading width, and the reading means reads the original at the predetermined reading width while the reading means and the original move relative to each other in the sub scanning direction; and image processing means for applying predetermined image processing to the image data of the original read by the reading means.

The foregoing object is achieved in another aspect of the present invention through the provision of an image processing method including: a controlling step of controlling such that reading means for reading an original at a predetermined reading width in the main scanning direction and the original move relative to each other in the main scanning direction and the sub scanning direction, the reading means reads the original at the predetermined reading width while the reading means and the original move relative to each other in the sub scanning direction, then the reading means and the original move relative to each other in the main scanning direction at a width smaller than the predetermined reading width, and the reading means reads the original at the predetermined reading width while the reading means and the original move relative to each other in the sub scanning direction; and an image processing step of applying predetermined image processing to the image data of the original read by the reading means.

The foregoing object is achieved in still another aspect of the present invention through the provision of an image processing apparatus on which recording means for recording on a recording sheet and original reading means for reading the original at a predetermined reading width are detachably mounted, including: original feeding means for feeding the original at a feed width smaller than the predetermined reading width; and image processing means for applying image processing to each image data included in at least each portion at which the preceding read section and the current read section overlap.

The foregoing object is achieved in a further aspect of the present invention through the provision of an image processing method which includes a recording step of recording on a recording sheet and an original reading step for reading the original at a predetermined reading width, including: an original feeding step of feeding the original at a feed width smaller than the predetermined reading width; and an image processing step of applying image processing to each image data included in at least each portion at which the preceding read section and the current read section overlap.

The foregoing object is achieved in a still further aspect of the present invention through the provision of a storage medium storing a program including a recording module for recording on a recording sheet and an original reading module for reading the original at a predetermined reading width, wherein a program is stored including: an original feeding module for feeding the original at a feed width smaller than the predetermined reading width; and an image processing module for applying image processing to each image data included in at least each portion at which the preceding read section and the current read section overlap.

With the above configuration, a high-quality image is obtained.

The foregoing object and advantages, and further objects and advantages of the present invention will become apparent from the following description of the preferred embodiment.

While the present invention will be described with reference to what are presently considered to be the preferred embodiment, it is to be understood that the invention is not limited to the embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

BRIEF DESCRIPTION OF THE DRAWINGS

FIGS. 7A and 7B are views showing band unevenness and functions for the band unevenness.

DESCRIPTION OF THE PREFERRED EMBODIMENT

Figure 1:
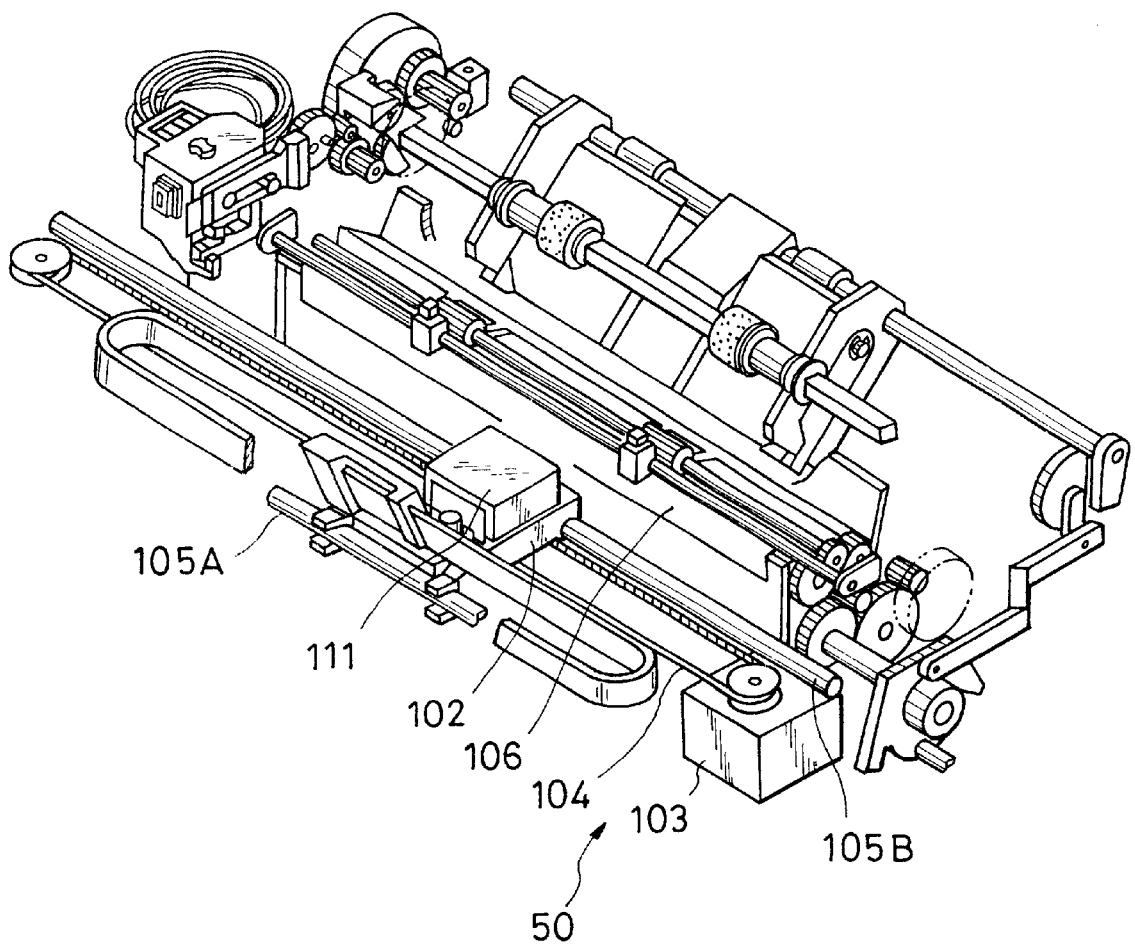
FIG. 1 is a perspective view of an image processing apparatus according to an embodiment of the present invention.

FIG. 1 is a perspective view of an image processing apparatus according to an embodiment of the present invention.

Figure 3:
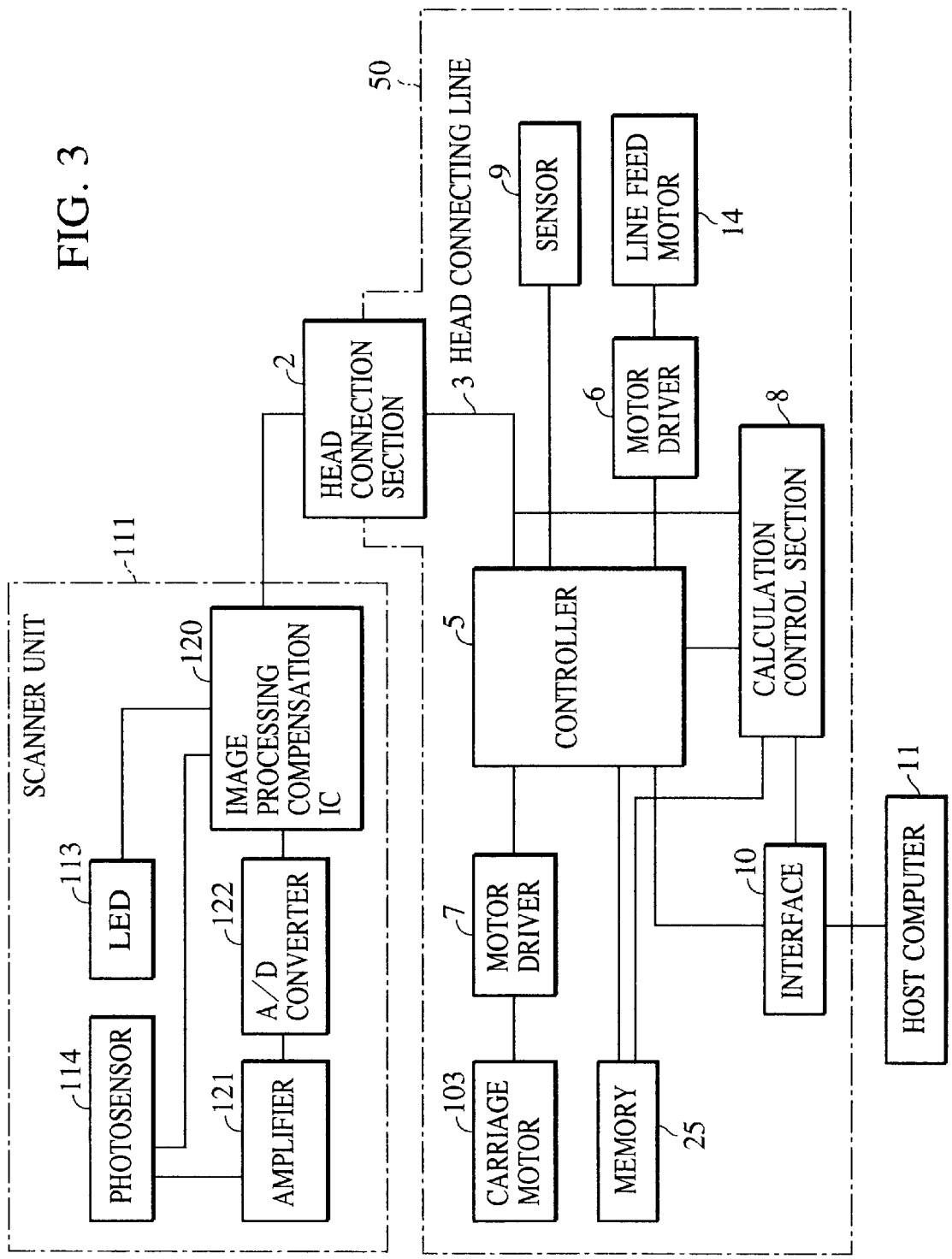
FIG. 3 is a block diagram of an ink-jet recording apparatus 50.

The image processing apparatus according to the present embodiment of the invention serves as an ink-jet recording apparatus 50. The ink-jet recording apparatus 50 includes a controller 5, described later, which controls the entire ink-jet recording apparatus 50, a calculation control section 8, and a memory 25 which stores a control program executed by the controller 5 and the calculation control section 8, as shown in FIG. 3. The memory 25 may be configured by a hard disk or a non-volatile ROM.

In FIG. 1, a scanner unit 111 (original reading means, reading means) for reading an image is mounted on a carriage 102. On the carriage 102, the scanner unit 111 can be replaced with a recording head 101 (recording means, not shown) for recording on a recording sheet with ink. The carriage 102 is moved along the shaft of a platen 106 (original feeding means) for holding a recording sheet or an original to be read, by the use of a driving belt 104 driven by a carriage motor 103. The carriage 102 is guided by two parallel guide shafts 105A and 105B.

When the recording head 101 is mounted on the carriage 102, an image or a character is recorded on a recording sheet placed on the platen 106. When the scanner unit 111 is mounted on the carriage 102, the original to be read which is placed on the platen 106 is scanned and read while the scanner unit 111 is moved in the direction of the shaft of the platen 106 along the original.

Figure 2:
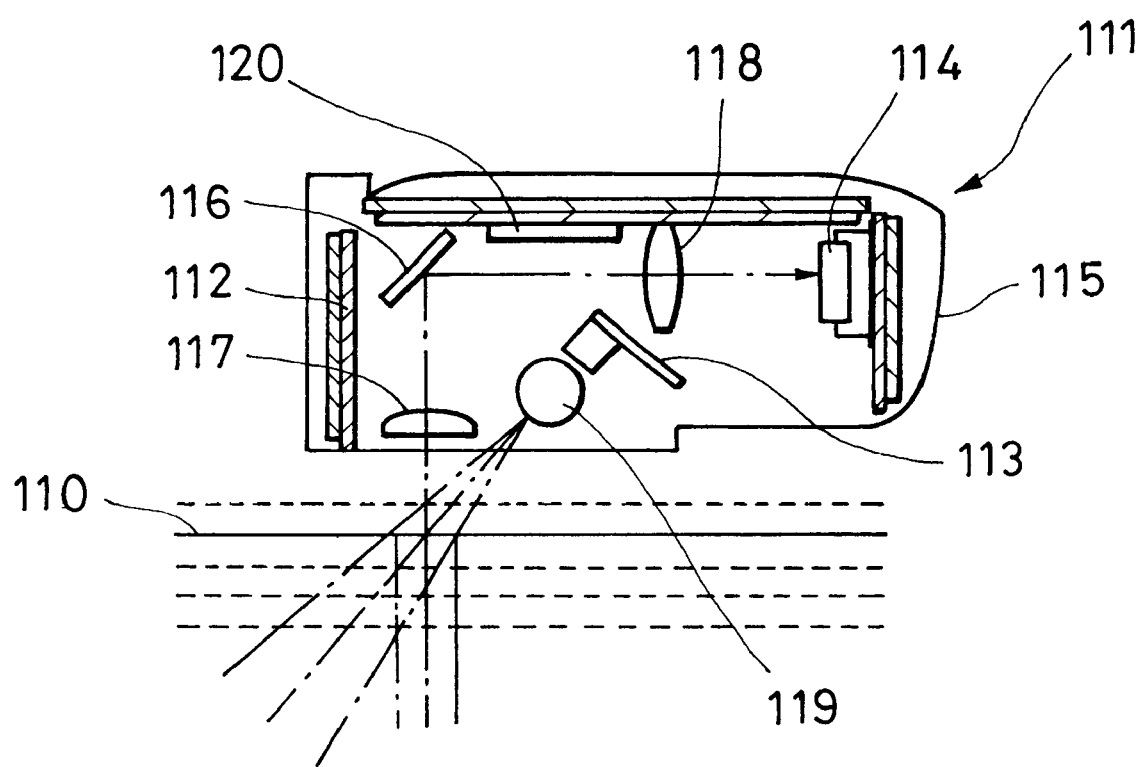
FIG. 2 is a structural view of the scanner unit 111 shown in FIG. 1.

FIG. 2 shows the structure of the scanner unit 111 shown in FIG. 1. The scanner unit 111 has a casing 115 having a substantially rectangular-parallelepiped shape. Inside the casing 115, an electric circuit board 112 is mounted. The electric circuit board 112 is provided with an LED 113 which emits light onto an original 110 placed on the platen 106, a photosensor 114 which applies photoelectric conversion to light reflected from a character or image on the original 110, a mirror 116, a field lens 117, an imaging lens 118, a rod lens 119, main components, such as an image processing compensation IC 120, for circuit control, A/D conversion, and image processing, and other electric components (not shown) such as a resistor, capacitor, coil, and oscillator.

Image data processed by the image processing compensation IC 120 is sent to the ink-jet recording apparatus 50, and then transmitted to a host computer 11 shown in FIG. 3.

FIG. 3 shows the entire structure of the ink-jet recording apparatus 50.

The ink-jet recording apparatus 50 shown in FIG. 3 is provided with the scanner unit 111 on the carriage 102 shown in FIG. 1 and connected to the host computer 11.

The ink-jet recording apparatus 50 is provided with the carriage 102 (shown in FIG. 1) for mounting the scanner unit 111 or a recording head (not shown), a head connection section 2 included in the carriage 102 for connecting to the scanner unit 111 or the recording head, the carriage motor 103 for driving the carriage 102 horizontally, a motor driver 7 for controlling the operation of the carriage motor 103, a line feed motor 14 for rotating the cylindrical platen 106 (shown in FIG. 1), a motor driver 6 for controlling the operation of the line feed motor 14, and a sensor 9 which determines whether a recording sheet for image recording or an original from which an image is to be read is set, and in addition, whether the carriage is disposed at the home position.

The ink-jet recording apparatus 50 is also provided with an interface 10 for connecting to the host computer 11, the memory 25 for storing a control program, printing fonts, image data received from the scanner unit 111, and image data received from the host computer 11, and the controller 5. The motor drivers 6 and 7, the sensor 9, the interface 10, and the memory 25 are connected to the controller 5. The head connection section 2 is also connected to the controller 5 through a head connecting line 3. With the cooperation of the calculation control section 8, the controller 5 controls the carriage motor 103 and the line feed motor 14 through the motor drivers 6 and 7 and also controls the sensor 9, which determines whether a recording sheet or an original from which an image is to be read is set on a sheet stand (not shown) and whether the carriage 102 is disposed at the start position, by the use of the control program stored in the memory 25.

The scanner unit 111 includes a LED 113, a photosensor 114, an amplifier 121 for amplifying the signal detected by the photosensor 114, an analog/digital (hereinafter called A/D) converter 122 for applying A/D conversion to the signal amplified by the amplifier 121, and the image processing compensation IC 120.

The operation of the ink-jet recording apparatus 50 serving as a recording apparatus is described next.

The controller 5 receives character or image record data from the host computer 11 through the interface 10. The record data is received under control of the host computer 11 and the calculation control section 8. The controller 5 processes the received record data so as to record the data on a recording sheet using the recording head.

The controller 5 transmits the record data to the recording head through the head connecting line 3 and the head connection section 2 under control of the calculation control section 8, and records the transmitted record data onto a recording sheet using the recording head.

The operation of the driving mechanical section of the ink-jet recording apparatus 50 is described below.

The platen 106 (shown in FIG. 1) is rotated by the driving of the line feed motor 14 controlled by the calculation control section 8, the controller 5, and the motor driver 6 so that a recording sheet placed on the platen 106 is conveyed in the direction of this rotation. The platen 106 also serves as a record stand for holding a recording sheet when ink is blown from the recording head to the recording sheet.

The carriage 102 (shown in FIG. 1) holds the recording head and carries it along the recording sheet during recording. The carriage 102 holds the scanner unit 111 and carries it along the original from which an image is to be read during image reading. The carriage 102 is moved along the shaft of the platen 106 by the rotation of the carriage motor 103 controlled by the calculation control section 8, the controller 5, and the motor driver 7.

The operation of the ink-jet recording apparatus 50 serving as an image reading apparatus is described next.

When the ink-jet recording apparatus 50 operates as an image reading apparatus, the scanner unit 111 is mounted on the carriage 102 and the original from which an image is to be read is scanned along the shaft of the platen 106.

The LED 113 emits a light beam to the original. The photosensor 114 having a photoelectric conversion characteristic detects a light beam reflected by a character or an image included in the original and converts the amplified signal to an electric signal. The signal detected by the photosensor 114 is amplified by the amplifier 121 and sent to the A/D converter 122. The A/D converter 122 A/D-converts the signal amplified by the amplifier 121 and transmits it to the image processing compensation IC 120 as digital data. The image processing compensation IC 120 applies image processing such as shading compensation and binarization to the digital data and sends the data to the controller 5 as image data.

The image data is sent to the host computer 11 through a path reverse to that used for record data during recording. In other words, the image data is transmitted to the host computer 11 from the image processing compensation IC 120 through the head connection section 2, the head connecting line 3, the controller 5, and the interface 10.

In this path, The controller 5 changes the image data received from the image processing compensation IC 120 to that having a form easy to send at the interface 10 or easy to process by the host computer 11, and transmits the data to the host computer 11 under control of the calculation control section 8.

The operation of the driving mechanical section of the ink-jet recording apparatus 50 for image reading is described below. This operation is almost the same as that for recording.

The platen 106 is rotated by the driving of the line feed motor 14 controlled by the calculation control section 8, the controller 5, and the motor driver 6 so that a recording sheet placed on the platen 106 is conveyed in the direction of this rotation. The platen 106 also serves as a record stand for holding an original from which an image is to be read when the original is scanned by the scanner unit.

The carriage 102 holds the scanner unit 111 and carries it along the surface of the original from which an image is to be read. The scanner unit 111 reads the image as the carriage 102 is moved along the shaft of the platen 106 by the rotation of the carriage motor 103, as controlled by the calculation control section 8, the controller 5, and the motor driver 7.

The sensor 9 determines whether the original to be read is placed on the sheet stand (not shown) and whether the carriage 102 is disposed at the start position.

Figure 4:
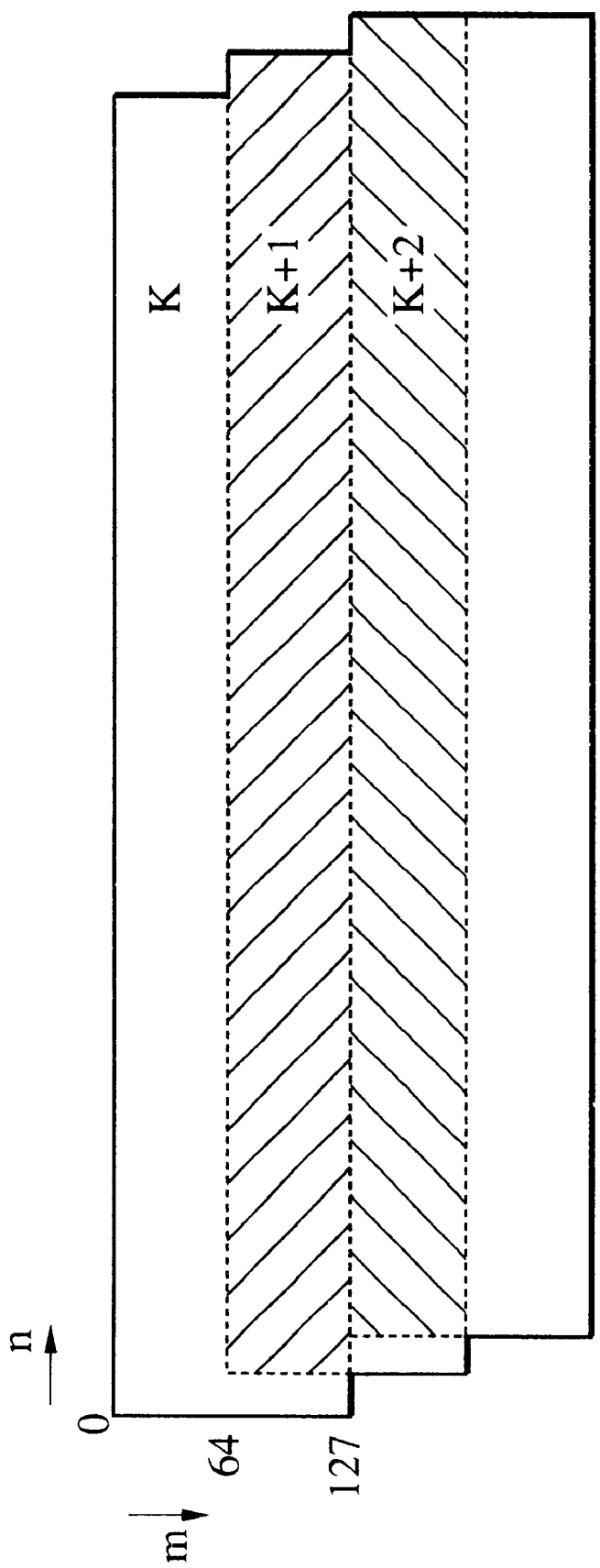
FIG. 4 is a view showing bands read by the scanner unit 111 shown in FIG. 1.
Figure 5:
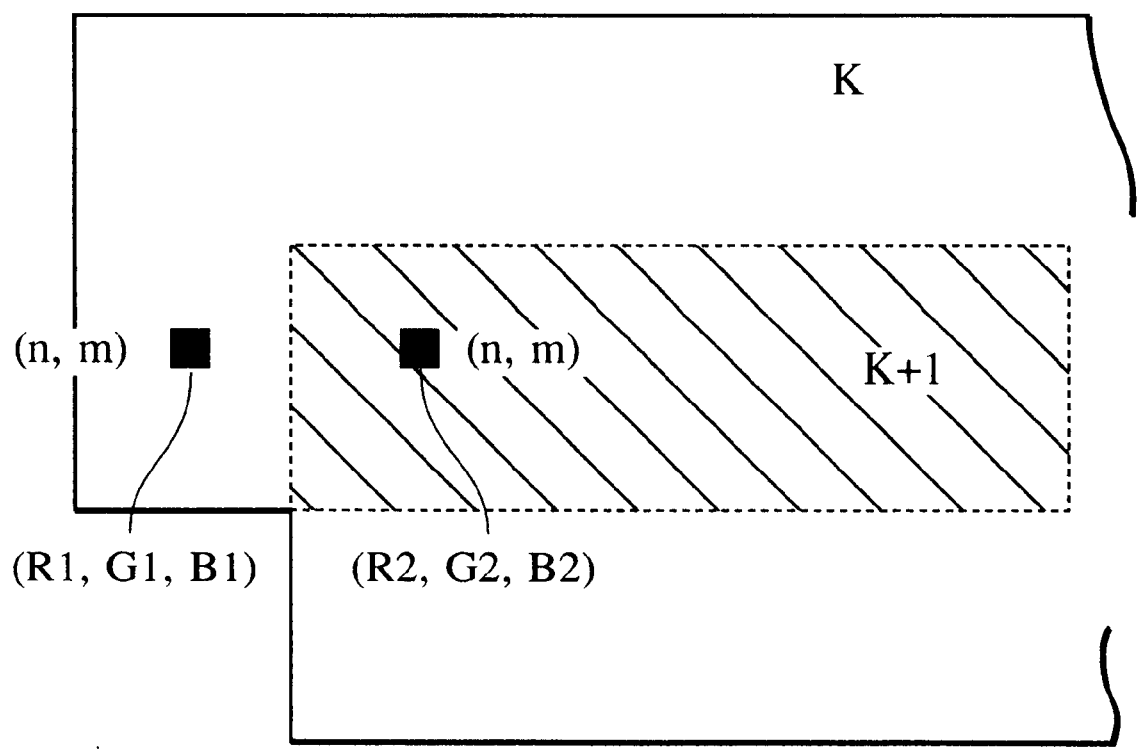
FIG. 5 is a view showing a portion of the bands read by the scanner unit 111 shown in FIG. 1, for which overlap reading is performed.

By referring to FIG. 4 and FIG. 5, a method is described in which the scanner unit 111 reads the original and applies image processing to the band read from the original. A series of image processing descried below is executed by control of the controller 5 and the calculation control section 8 according to the control program stored in the memory 25.

FIG. 4 shows bands read by the scanner unit 111 shown in FIG. 1. FIG. 5 shows a portion in the bands read by the scanner unit, at which overlap reading is performed. In FIG. 4 and FIG. 5, although the left end of each band is actually located at the same position, it is shown, for simplicity, with a right shift so that the left end of each band does not overlap with each other.

To read an original using the scanner unit 111, the scanner unit 111 is mounted on the carriage 102. The original is read in the direction in which the carriage 102 is moved. In a conventional method, when one band is completely read, the original is fed by a reading width, namely, one band width. And then the same operation is repeated to read one original. In monochrome reading, a green lamp is turned on to read the original. In full-color reading, a red (R) lamp, a green (G) lamp, and a blue (B) lamp are sequentially turned on to read the original.

In the present embodiment, when the current band is completely read, the original is fed by half the width of the band. When the next band is read, the lower half of the current band is overlappingly read. The band data of the lower half of the current band is stored in the memory 25 until the next band is read and averaging processing, described later, is finished for the overlappingly read band data. The memory 25 is a RAM or a hard disk provided for the ink-jet recording apparatus 50 in the present embodiment. In monochrome reading, overlappingly read band data for one color is temporarily stored. In color reading, overlappingly read band data for three colors is temporarily stored.

When a band having a width of 128 pixels is read in full-color reading, for example, the k-th band red (R) data is read at a width of 128 pixels as shown in FIG. 5, the band data R1 for the lower half having coordinates (n, m) (n: natural numbers, m=64, 65, . . . , 126, 127) is stored in the memory 25, in succession the k-th band green (G) data is read at a width of 128 pixels in the same way, the band data G1 for the lower half having coordinates (n, m) (n: natural numbers, m=64, 65, . . . , 126, 127) is stored in the memory 25 so as not to overlap with the band data R1, finally the k-th band blue (B) data is read at a width of 128 pixels, and the band data B1 for the lower half having coordinates (n, m) (n: natural numbers, m=64, 65, . . . , 126, 127) is stored in the memory 25 so as not to overlap with the band data G1 and the band data R1.

Red (R) data, green (G) data, and blue (B) data is read at a width of 128 pixels in the next (k+1)-th band, and the band data R2, G2, and B2 for the upper half having coordinates (n, m) (n: natural numbers, m=0, 1, . . . , 62, 63) of the (k+1)-th band red (R) data, green (G) data, and blue (B) data is stored in the memory 25. Then, averaging processing is applied to the band data R1, G1, and B1, and the band data R2, G2, and B2. The data obtained by this averaging processing is called band data R0, G0, and B0. To use the memory 25 efficiently, a memory area occupied by the band data for the lower half of the K-th band, for which averaging processing has been finished, is released and at the same time band data for the lower half of the (k+1)-th band is stored in that memory area. Since the area of the memory 25 in which band data is stored is used in this way as a ring buffer, the entire processing is smoothly performed.

The band data R0, to which averaging processing has been applied, is obtained by the equation R0=(R1+R2)/2. In the same way, the band data G0 is obtained by the equation G0=(G1+G2)/2, and the band data B0 is obtained by the equation B0=(B1+B2)/2.

The data to which averaging processing has been applied through this series of operations, namely, the band data R0, G0, and B0, is used as the data obtained by reading the original. This averaging processing is repeatedly applied to the data of the area to be read in the original to form the whole data obtained by reading the original.

With the averaging processing described above being applied to band data, the noise level of an image is reduced by about 3 dB as compared with a case in which the averaging processing is not applied. In other words, the noise level of an image is reduced by 10 times Log(n) when overlap reading is performed n times. Therefore, when overlap reading is performed the required number of times, a high-quality image is obtained which has a reduced noise level.

Figure 6:
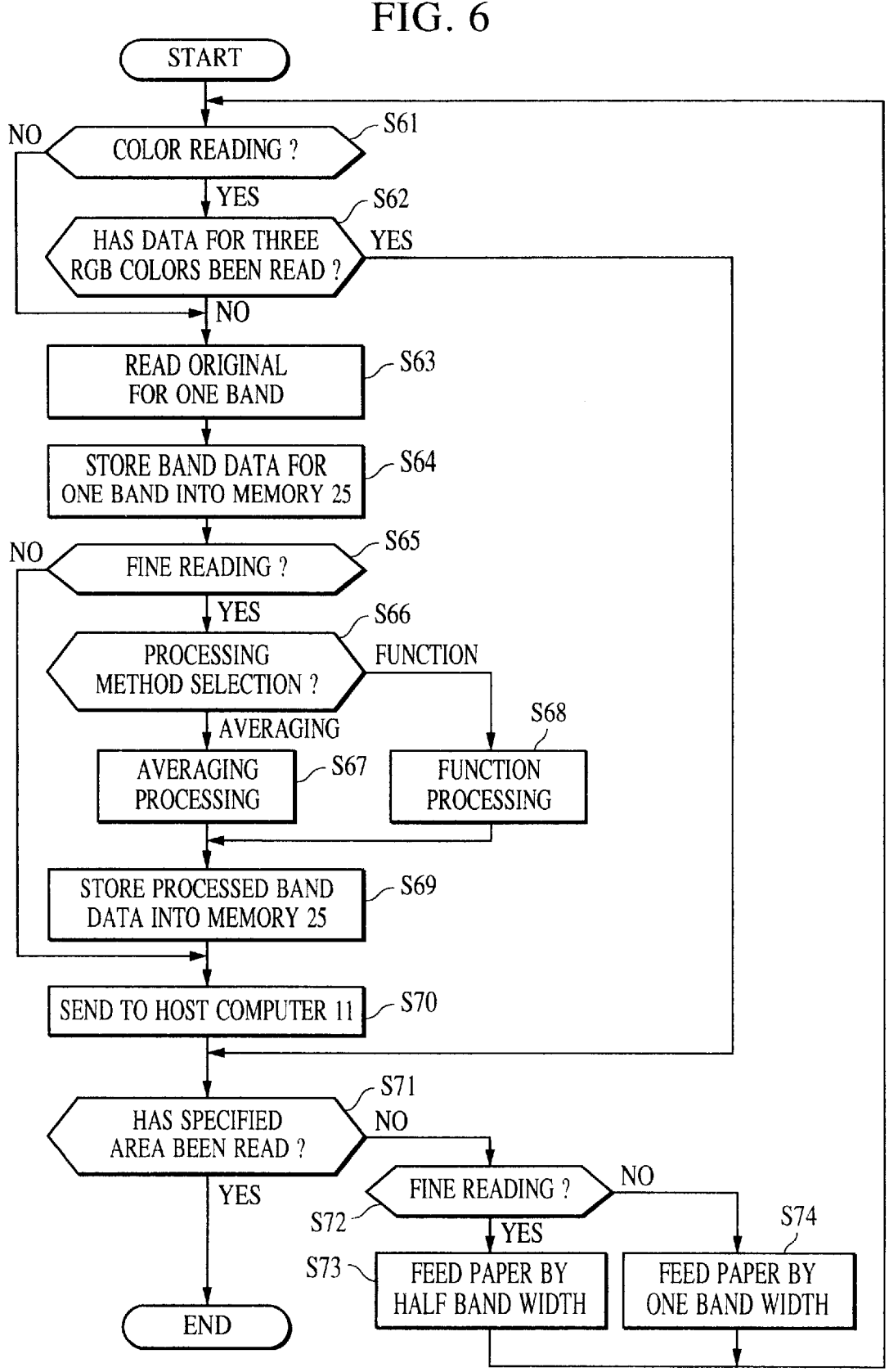
FIG. 6 is a detailed flowchart of a control program stored in the memory 25 and executed by the controller 5 and the calculation control section 8 of FIG. 3.

FIG. 6 shows in detail a control program stored in the memory 25 and executed by the controller 5 and the calculation control section 8.

It is first determined whether or not the scanner unit 111 performs color reading (step S61). When color reading is not performed, the procedure jumps to a step S63, described later. When color reading is performed, it is determined whether or not band data for three colors, red (R), green (G), and blue (B) has been read (step S62).

When the band data for the three colors has been read, the procedure jumps to a step S71, described later. When the band data for the three colors has not yet been read, the original is read for one band (step S63) and the band data for this band is stored in the memory 25 (step S64).

Next, it is determined whether or not fine reading is performed (step S65). Fine reading refers to overlap reading of band data. The user can specify fine reading through the ink-jet recording apparatus 50 or the host computer 11.

When fine reading is not performed in the step S65, the procedure jumps to a step S70, described later. When fine reading is performed, either averaging processing or function processing is selected as a processing method for the band data after fine reading (step S66).

When averaging processing is selected in the step S66, the averaging processing described above is applied to the band data obtained by fine reading (step S67). When function processing is selected, the function processing which is described later is applied to the band data obtained by fine reading (step S68). The function processing may be set such that a grade of fine reading is specified according to the type of the function to be used.

FIG. 7A shows band unevenness in a case in which fine reading is not performed, and FIG. 7B shows band unevenness and functions for the band unevenness in a case in which fine reading is performed.

In the function processing shown in FIG. 7B, for example, a function f1(coordinate m) is assigned to the k-th band red data (R1) at the lower half band width having coordinates m (m=64, 65, ..., 126, 127), and a function f2 (coordinate m) is assigned to the (k+1)-th band red data (R2) at the upper half band width having coordinates m (m=0, 1, ..., 62, 63). Band data R0 to which the function processing is applied is obtained by an equation (1).

$$R0 = R1 \times f1 \text{ (coordinate } m\text{)} + R2 \times f2 \text{ (coordinate } m\text{)} \tag{1}$$

In the equation (1), the functions f1(coordinate m) and f2(coordinate m) satisfy the condition, f1(coordinate m)+f2 (coordinate m)=1. Such functions include a linear function and (1−linear function), and the square cosine function and the square sine function.

The equation (1) may be weighted according to the nature of band unevenness. In this case, the functions f1(coordinate m) and f2(coordinate m) may satisfy the condition, f1(coordinate m)+f2(coordinate m)≠1.

In the above-described function processing, it is expected that the noise level is reduced according the function used. With a number of functions being prepared, the user can specify the grade of fine reading in advance through the ink-jet recording apparatus 50 or the host computer 11.

Returning to FIG. 6, the band data to which the averaging processing has been applied in the step S67 or the band data to which the function processing has been applied in the step S68 is stored in the memory 25 for processing of the next band data (step S69).

After this operation, the band data stored in the memory 25 is transmitted to the host computer 11 (step S70). It is then determined whether the specified area of the original has been read (step S71). When the specified area has been read, the processing is ended. When the specified area has not yet been read, it is determined whether fine reading is being performed (step S72).

When it is determined in the step S72 that fine reading is being performed, the original is fed by half the band width (step S73) and the procedure returns to the step S61. When fine reading is not being performed, the original is fed by one band width (step S74) and the procedure returns to the step S61.

As described above, according to the embodiment of the present invention, since band data is overlappingly read and the averaging processing or function processing is applied to the band data at an overlapped portion, band unevenness is eliminated and a high-quality image is obtained.

In the present embodiment, the averaging processing for band data at half the band width has been described in detail. The present invention can also be applied to a case, for example, in which band data at the lower 1/x (x indicates a real number more than 1) of the current band is overlappingly read and averaging processing is applied to the band data at a width of a 1/x band.

In the present embodiment, the band data R0 to which the averaging processing is applied is obtained by the equation, R0=(R1+R2)/2. In the averaging processing, the average value of overlapped band data needs to be obtained. With overlapped band data R1, R2, and R3, the band data R0 is obtained by the equation, R0=(R1+R2+R3)/3.

In the present embodiment, the ink-jet recording apparatus has been described in detail. The present invention can also be applied to a recording apparatus which uses a dot-matrix recording head or a thermal transfer recording head.

In the present embodiment, the scanner unit 111 is moved in the main scanning direction to read the secured original. The original may be moved in the main scanning direction with the scanner unit 111 being secured.

In the present embodiment, the original is moved in the sub scanning direction so as to overlappingly read band data. The scanner unit 111 may be moved in the sub scanning direction with the original being secured, to overlappingly read band data.

What is claimed is:

1. An image processing apparatus comprising:
   a reading unit adapted to read an original at a predetermined reading width in a main scanning direction;
   a controlling unit adapted to control said reading unit and the original so as to move relative to each other in the main scanning direction and a sub scanning direction, where, in a first main scanning direction, said reading unit reads the original at the predetermined reading width and, in the sub scanning direction, said original is fed by 1/x (x is a real number larger than 1) of the predetermined reading width, and in a subsequent main scanning direction, said reading unit overlappingly reads the original at the predetermined reading width; and
   an image processing unit adapted to apply predetermined image processing to an overlapped part of the image data of the original read by said reading unit.

2. An image processing apparatus according to claim 1, wherein 1/x is equal to or smaller than ½.

3. An image processing method comprising:

a reading step, of reading an original at a predetermined reading width in a main scanning direction;

a controlling step, of controlling a reading unit and the original so as to move relative to each other in the main scanning direction and a sub scanning direction, where, in a first main scanning direction, the reading step reads the original at the predetermined reading width and, in the sub scanning direction, said original is fed by 1/x (x is a real number larger than 1) of the predetermined reading width, and in a subsequent main scanning direction, the reading step overlappingly reads the original at the predetermined reading width; and an image processing step, of applying predetermined image processing to an overlapped part of the image data of the original read in the reading step.

4. An image processing method according to claim 3, wherein 1/x is equal to or smaller than ½.

5. A computer-readable storage medium for storing a program for image processing, the program comprising:

code for a reading step, of reading an original at a predetermined reading width in a main scanning direction;

code for a controlling step, of controlling a reading unit and the original so as to move relative to each other in the main scanning direction and a sub scanning direction, where, in a first main scanning direction, the reading step reads the original at the predetermined reading width and, in the sub scanning direction, said original is fed by 1/x (x is a real number larger than 1) of the predetermined reading width, and in a subsequent main scanning direction, the reading step overlappingly reads the original at the predetermined reading width; and code for an image processing step, of applying predetermined image processing to an overlapped part of the image data of the original read in the reading step.

6. A computer-readable storage medium for storing a program for image processing according to claim 5, wherein 1/x is equal to or smaller than ½.

* * * * *

UNITED STATES PATENT AND TRADEMARK OFFICE
CERTIFICATE OF CORRECTION

PATENT NO. : 6,658,170 B1
DATED : December 2, 2003
INVENTOR(S) : Akihiko Nakatani et al.

It is certified that error appears in the above-identified patent and that said Letters Patent is hereby corrected as shown below:

Title page,
Item [56], References Cited, FOREIGN PATENT DOCUMENTS, "05014610" should read -- 05-014610 --.

Column 2,
Line 55, "are" should read -- is --.

Column 5,
Line 13, "A/D-" should be deleted;
Line 26, "The" should read -- the --;
Line 55, "descried" should read -- described --; and
Line 65, "each" should read -- the --.

Column 7,
Line 64, "according" should read -- according to --.

Signed and Sealed this

Thirteenth Day of July, 2004

JON W. DUDAS
*Acting Director of the United States Patent and Trademark Office*